Nov. 3, 1970

M. CLERC
3,537,795
OPTICAL SCANNING DEVICE FOR RAPID SPECTROSCOPY

Filed Nov. 29, 1967

INVENTOR
MICHEL CLERC

United States Patent Office 3,537,795
Patented Nov. 3, 1970

3,537,795
OPTICAL SCANNING DEVICE FOR RAPID SPECTROSCOPY
Michel Clerc, Gif-sur-Yvette, France, assignor to Commissariat a l'Energie Atomique, Paris, France
Filed Nov. 29, 1967, Ser. No. 686,666
Claims priority, application France, Nov. 30, 1966, 85,700
Int. Cl. G01n *21/34;* G01j *3/06*
U.S. Cl. 356—51                    7 Claims

ABSTRACT OF THE DISCLOSURE

The device comprises, in combination with the usual rotating mirror (first mirror) receiving the dispersed beam to be observed, a series of fixed second mirrors, advantageously parabolic or elliptical, disposed to receive successively, in the course of half-revolution of the first mirror, the dispersed beam reflected by the first mirror and to focus these beams on one, two or a small number of slits, these slits being projected by a small number of concentration third mirrors, fewer in number than the second mirrors, and advantageously elliptical, on one, two or a very small number of detectors.

---

Figure 1:
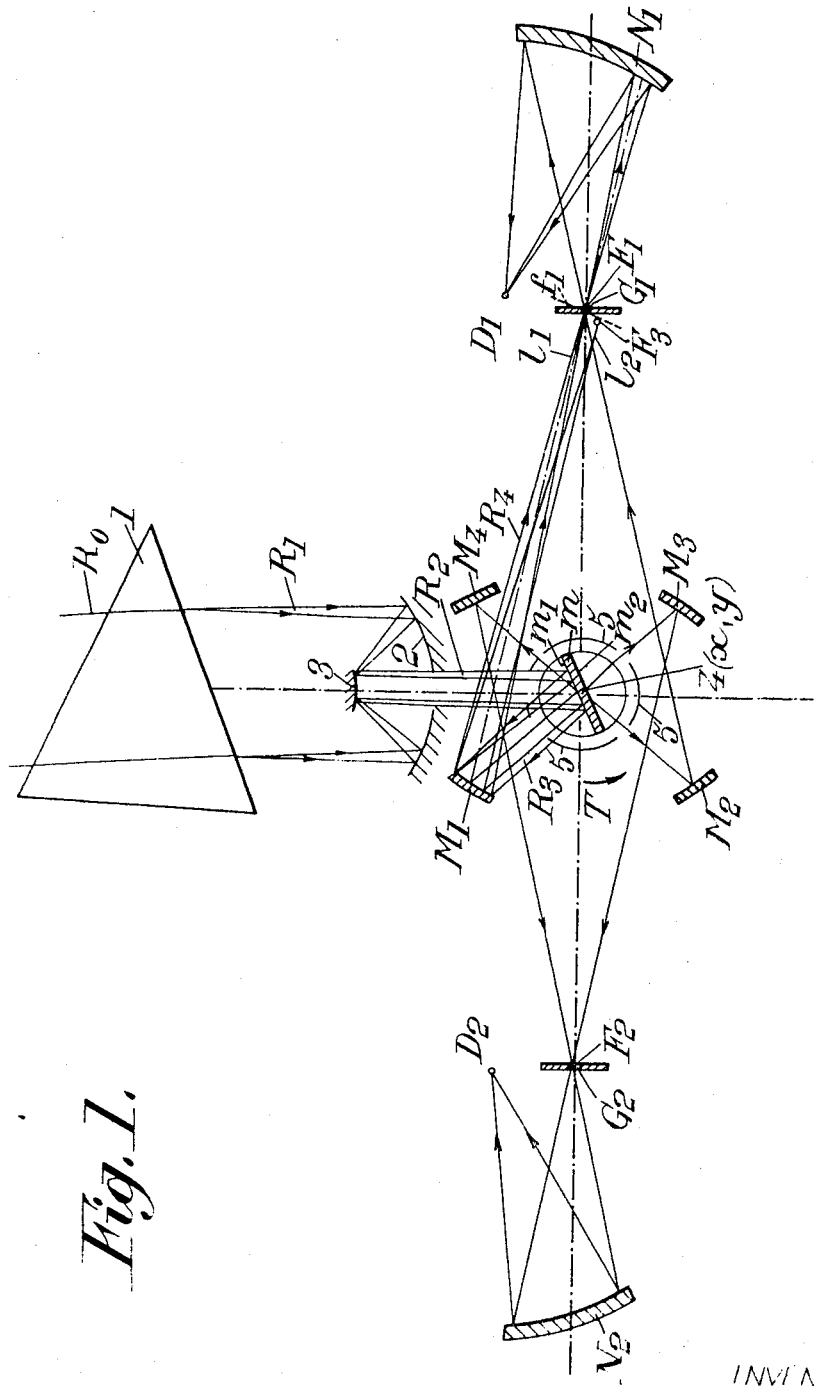

The present invention relates to optical scanning devices, that is to say to devices which direct a succession of luminous beams spaced apart in time onto a single optical detector or a small number of optical detectors. The invention is concerned more particularly, but not exclusively, with devices intended for rapid infra-red spectrography, that is to say devices which permit the recording of a series of infra-red spectra, spaced apart in time, in the course of a single revolution of the mirror for scanning the wavelengths in infra-red spectrograph or spectrophotograph.

Scanning devices for infra-red spectrography are already known, which can, for example, follow the evolution, in the course of time, of the concentration of transitory chemical species appearing in a rapid chemical reaction. Most of these devices use a rotating mirror which is a plane mirror placed in the path of the beam to be observed which is dispersed by a diffraction grating or a prism. In particular, the rotation of the mirror reflecting the beam has been effected in a Littrow mounting having a double path for the luminous beam through the dispersing system (notably a prism). This method has the disadvantage that the periods of useful scanning are separated by periods, of the order of twenty times longer, during which the beam is not reflected by the mirror and thus is not recorded. Thus, if it is supposed that a mirror is used which reflects on its two faces and that the angle of rotation during which each face of the mirror reflects the desired wavelengths is equal to 9° (it is in general between 5° and 10°), the relation between the durations of the alternating inactive and active periods is equal to $$\frac{180-9}{9}=19$$

Thus there is a risk that some very interesting transitory phenomena can be missed, since the device is blind 19/20 or 95% of the time. Thus certain chemical species of short lifespan risk to be not detected. It will be noted that increasing the speed of rotation of the mirror, although it permits the absolute duration of the inactive periods to be reduced, does not modify the ratio mentioned above between the inactive and active periods. One might think of using, instead of a single mirror, a system of mirrors disposed to form a rotating prism, but it is more difficult to make such a mounting turn at high speed. The only solution with devices of the prior type, if one wishes to be sure that certain very short phenomena do not escape, is to use several spectrographs, but this is a costly solution.

An object of the present invention is to provide an optical scanning device which does not have the disadvantages mentioned above.

Another object of the invention is to improve such devices, in particular so that they insure, on the one hand, a high ratio between the duration of each usable operational period and the duration of each unusable non-operational period, and a reduction of the duration of each non-operational period, and on the other hand, a reduced cost price and an increased robustness.

According to the present invention, an optical scanning device is characterized by the fact that it comprises, in combination with the usual rotating mirror (called hereafter "first mirror") receiving the dispersed beam to be observed, a series of fixed mirrors (called hereafter "second mirrors"), advantageously parabolic or elliptical, disposed to receive succesively, in the course of a half-revolution of the first mirror, the dispersed beam reflected by the first mirror and to focus these beams on one, two or a small number of slits, these slits being projected by a small number of concentration mirrors (called hereafter "third mirrors"), adavntageously elliptical, on one, two or a very small number of detectors, there being fewer third mirrors than second mirrors.

The invention is particularly applicable to optical scanning devices for rapid infra-red spectrography.

Figure 2:
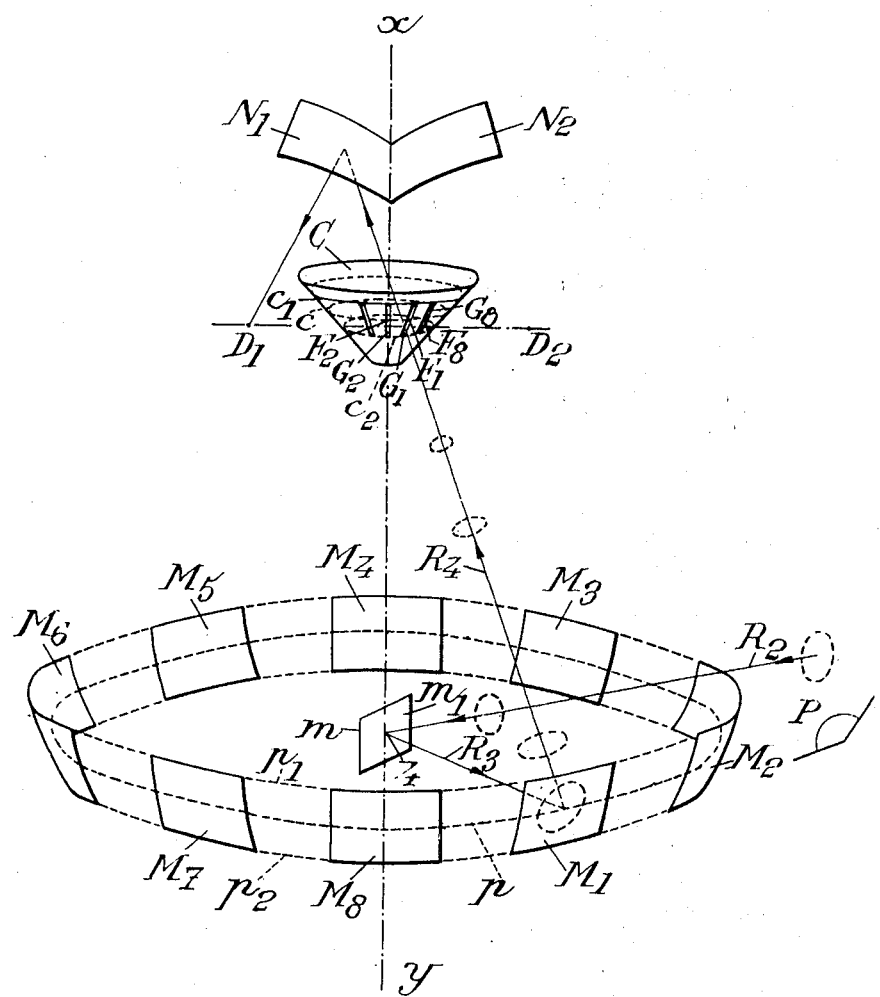

Particular embodiments of the invention will now be described by way of example, with reference to the accompanying drawings in which:

FIGS. 1 and 2 show two embodiments of an optical scanning device, provided with the improvements according to the invention.

These two embodiments are particularly intended for rapid infra-red spectrography.

In the embodiment illustrated in FIG. 1, the rotating (first) mirror has been represented at $m$, this rotating mirror having two reflecting faces $m_1$ and $m_2$ which receive the dispersed beam $R_2$ to be observed. In this embodiment, the initial parallel beam $R_0$ is dispersed by the prism 1, the cross-section of the beam $R_1$ leaving the prism (the extreme luminous rays of the beam have been shown for the two limit wavelengths) being reduced by a Cassegrain telescope having mirrors 2 and 3 (or possibly by a telescope having two concave parabolic mirrors of the type used in the rotating mirror Littrow mountings) in order to be able to use a first mirror $m$ of small dimensions, and hence adapted to be driven at very high speeds of rotation (for example of the order of 5,000 to 10,000 revolutions/second).

The device comprises in addition a series of fixed (second) mirrors, for example two pairs of parabolic mirrors $M_1$, $M_2$ and $M_3$, $M_4$, the mirrors $M_1$ and $M_2$ of the first pair having a common focus $F_1$, whereas the mirrors $M_3$ and $M_4$ of the second pair have a common focus $F_2$ symmetrical with respect to $F_1$ about the axis $xy$ of rotation of the rotating first mirror $m$, this axis being projected at 4 in the plane of the figure.

In the position of the first mirror $m$ illustrated in FIG. 1, the reflecting face $m_1$ of this mirror reflects the beam $R_2$, as a reflected beam $R_3$, onto the second mirror $M_1$ which reflects the beam $R_3$, as a reflected beam $R_4$, thus forming a ray on the focal surfaces $f_1$ passing through $F_1$. In FIG. 1, the path of the two luminous beams of extreme wavelengths $l_1$ and $l_2$ forming images at $F_1$ and $F_3$ have been shown, each wavelength arriving at the mirrors in the form of a parallel beam, but at an angle of incidence which is a function of this wavelength.

A slit $G_1$, formed in a wall portion, is placed at $F_1$ perpendicular to the beam $R_4$, and the rays of different wavelengths pass successively through this slit when the first mirror $m$ rotates through an angle, of the order of 20° for example, in the course of which it reflects, with its face $m_1$, the beam $R_2$ onto the second mirror $M_1$.

If it is supposed that the first mirror $m$ rotates in the direction of the arrow T, its face $m_1$, after reflecting the beam $R_2$ onto the fixed second mirror $M_3$, reflects this beam successively onto the fixed second mirrors $M_4$, $M_1$ and $M_2$. The mirror $M_2$, like the mirror $M_1$, reflects the beam $R_2$ onto the slit $G_1$ disposed at $F_1$, whereas the mirrors $M_3$ and $M_4$ reflect the beam $R_2$ onto a slit $G_2$, also formed in a wall portion, disposed at $F_2$ perpendicular to the incident beam (for the mirrors $M_2$, $M_3$ and $M_4$ only the median ray has been shown in FIG. 1). A casing 5 limits the luminous beam arriving at the mirror $m$ or reflected by this mirror.

After a half-revolution of the mirror $m$, this mirror is once again in its initial position, except that the faces $m_1$ and $m_2$ are interchanged, and an analogous 180° cycle begins again. Thus the face $m_2$ reflects the beam $R_2$ successively onto $M_3$, $M_4$, $M_1$ and $M_2$. The two latter mirrors reflect the rays successively through the slit $G_1$ placed at $F_1$, whereas the mirrors $M_3$ and $M_4$ reflect the luminous beams to make the rays pass successively through the slit $G_2$ placed at $F_2$.

The elliptical (third) mirrors $N_1$ and $N_2$, acting as camera objectives, focus the light from each slit $G_1$ and $G_2$ respectively at $D_1$ and $D_2$ where two rapid detectors (for example of the doped germanium type) are placed. These detectors $D_1$ and $D_2$ transform the luminous intensity (infra-red) into an electric voltage in a substantially linear manner, the voltages of the two detectors being indicated by a single cathode-ray oscillograph which records successively the spectra to be studied.

In one complete revolution of the mirror $m$, the beam $R_2$ is reflected successively as indicated in the following table:

$m_1$—$M_1$—$F_1$—$N_1$—$D_1$ ------  
$m_1$—$M_2$—$F_1$—$N_1$—$D_1$ ------  
$m_2$—$M_3$—$F_2$—$N_2$—$D_2$ ------  
$m_2$—$M_4$—$F_2$—$N_2$—$D_2$ ------  Successive indication by a single cathode-
$m_2$—$M_1$—$F_1$—$N_1$—$D_1$ ------  ray oscillograph.
$m_2$—$M_2$—$F_1$—$N_1$—$D_1$ ------  
$m_1$—$M_3$—$F_2$—$N_2$—$D_2$ ------  
$m_1$—$M_4$—$F_2$—$N_2$—$D_2$ ------

Thus eight spectra are registered during one 360° revolution of the mirror $m$ (instead of two spectra in the prior art). If each spectrum corresponds to a rotation of 20°, the ratio between the durations of the active and inactive periods will be equal to $$\frac{20 \times 8}{360 - 20 \times 8} = \frac{160}{200} = 0.8$$

This ratio can be increased by disposing one or more pairs of supplementary fixed second mirrors within the limits of the available space. (Another solution is given by the embodiment of FIG. 2.)

One of the advantages of the mounting of FIG. 1 is its simplicity and the fact that all the fixed parabolic second mirrors are of identical form.

In a variation of the embodiment shown in FIG. 1, the four fixed second mirrors $M_1$, $M_2$, $M_3$ and $M_4$ are not parabolic mirrors, but elliptical mirrors disposed so that these four elliptical mirrors have a first common focus at 4, at the intersection of the plane of FIG. 1 with the axis of rotation $xy$ of the rotating first mirror $m$, and a second focus at $F_1$ for the mirrors $M_1$ and $M_2$ and at $F_2$ for the mirrors $M_3$ and $M_4$. In this case, any luminous ray coming from 4 will pass through $F_1$ or $F_2$, all the optical paths $\overline{4M_1F_1}$, $\overline{4M_2F_1}$, $\overline{4M_3F_2}$, $\overline{4M_4F_2}$ being equal, according to the fundamental property of ellipsoids. To obtain the best astigmatic conditions, the apparatus is arranged so that the luminous spot formed by the beam $R_2$ on the mirror $m$ is as small as possible, for example by defocusing the Cassegrain telescope 2 and 3 in order to make the beam $R_2$ converge on the surface $m_1$ or $m_2$ of the rotating mirror, in the neighbourhood of the point 4. Apart from these two modifications (mirrors $M_1$ to $M_4$ elliptical and defocusing of the Cassegrain telescope), the mounting is similar to that illustrated in FIG. 1.

The embodiment illustrated in FIG. 2 represents, in a way, the extension in space of the embodiment of FIG. 1.

The fixed parabolic second mirrors $M_1$ to $M_8$ are disposed about the vertical axis $xy$ of rotation of the plane first mirror $m$ having reflecting faces $m_1$ and $m_2$, in the neighbourhood of the horizontal plane P in which is located the central ray of the dispersed beam $R_2$ to be observed. (FIG. 2 shows at $p$ the circle of the plane P passing through the reflecting surface of the mirrors $M_1$ to $M_8$ disposed between the circles $p_1$ and $p_2$, these mirrors $M_1$ to $M_8$ occupying substantially half the area of of the band or zone comprised between $p_1$ and $p_2$.) The foci $F_1$ to $F_8$ of these parabolic mirrors $M_1$ to $M_8$ are disposed in a horizontal circle $c$, of small diameter, placed well above the zone $p_1$-$p_2$ and centered on the axis $xy$.

In FIG. 2, the path of the middle ray of the beams $R_2$, $R_3$ and $R_4$ have been shown. At the point $F_1$ is disposed a slit $G_1$, at the point $F_2$ a slit $G_2$ etc. . . . The eight slits $G_1$ to $G_8$ placed at the foci $F_1$ to $F_8$ of the fixed parabolic mirrors $M_1$ to $M_8$ are disposed in a conical wall C (between two circles $c_1$ and $c_2$) tangent to the circle $c$ and perpendicular to the middle rays (such as $R_4$) coming from the mirrors $M_1$ to $M_8$.

The two elliptical third mirrors $N_1$ and $N_2$ reflect the image of the slits $G_1$ to $G_8$—through each of which pass successively the successive wavelengths of the spectrum to be examined when the mirror $m$ rotates—at points $D_1$ and $D_2$ where ultra rapid infra-red detectors are placed (for example of the doped germanium type) which transform the luminous intensity into an electric voltage in a substantially linear manner, the output of these detectors being connected for example to a single oscillograph.

In FIG. 2, there is shown in dashed lines, about the middle ray, the cross-section of the various beams (circular for the beams $R_2$ and $R_3$, elliptical for the beam $R_4$), and by arrows the direction of propagation of this middle ray right up to the detector placed at $D_1$.

In the embodiment of FIG. 2, each face of the mirror $m$ permits, in the course of a half-revolution, the recording of eight spectra. Thus 16 spectra are obtained per revolution of the mirror, the ratio between the durations of the inactive periods and the active periods being of the order of 1, thus a coefficient of use of 50%, which is excellent.

The present invention thus provides, regardless of the embodiment adopted, an optical scanning device, in particular for rapid infra-red spectrography, which has, with respect to existing devices, numerous advantages, in particular the following:

First of all it permits the recording of a large number of spectra per revolution of the rotating mirror, the proportion of the useful periods for recording the spectra in the total duration being high.

It comprises only a single rotating element, namely a plane mirror, which can be of small size and thus driven at very high speed.

The complications of mounting are carried over to the fixed elements of the device, which simplifies adjustment.

The device is robust and of a reduced cost price.

Various modifications are possible, without departing from the scope of the invention, such as using, instead of elliptical or parabolic mirrors, plane mirrors disposed to reflect towards a limited number of points (such as $F_1$ and $F_2$) the beams (such as $R_3$) reflected by the rotating mirror $m$.

Although the invention has been described with reference to particular embodiments, it should be understood that the invention is not limited thereto, and that various modifications are possible without departing from the spirit or scope of the invention.

What I claim is:
1. Optical scanning device comprising:
   means for dispersing a beam to be observed to form a dispersed beam comprising rays of different wave lengths,
   a first plane mirror, with two parallel reflecting faces, rotatably mounted for reflecting said dispersed beam,
   a plurality of substantially identical fixed second mirrors disposed to receive successively, in the course of a half-revolution of said first mirror, the beam reflected by said first mirror,
   a plurality of wall portions each containing a slit, each said second mirror serving to focus the beam which it receives onto one of said slits whereby said rays of different wave lengths pass successively through said slits,
   at least two third mirrors disposed behind said slits to reflect said rays passing through said slits, there being fewer third mirrors than second mirrors,
   and at least two detectors, but not more detectors than third mirrors, disposed to receive the rays reflected by said third mirrors.
2. Optical scanning device according to claim 1 in which said second mirrors are parabolic.
3. Optical scanning device according to claim 1 in which said second mirrors are elliptical.
4. Optical scanning device according to claim 1 in which said third mirrors are elliptical.
5. Optical scanning device according to claim 1
   in which said second mirrors are parabolic and are disposed in two groups, the second mirrors of one of said two groups having a common focus and the second mirrors of the other of said two groups having a common focus, said two foci being symmetrical with each other about the axis of rotation of said rotatable first mirror,
   and in which two wall portions are provided, each having a slit, one of said wall portions being disposed with its slit at one of said foci, and the other of said wall portions being disposed with its slit at the other of said foci,
   and in which there are only two third mirrors, said third mirrors being disposed respectively behind said two slits.
6. Optical scanning device according to claim 1
   in which said second mirrors are parabolic and are disposed substantially in a circle about the axis of rotation of said rotatable first mirror, said second mirrors having their foci disposed in a circle of smaller diameter than the circle in which said second mirrors themselves are disposed, said circle of foci lying in a plane perpendicular to the axis of rotation of said rotatable first mirror, said plane of foci being separated in the direction of said axis of rotation from said circle of second mirrors,
   and in which there are a plurality of wall portions, each having a slit, each slit corresponding to a second mirror, said wall portions being disposed with their slits respectively at said foci to receive substantially perpendicularly the beam reflected by said second mirrors.
7. Optical scanning device according to claim 1
   in which there are two third mirrors, said third mirrors being elliptical camera objectives,
   and in which there are two detectors, said detectors being doped germanium detectors.

References Cited

UNITED STATES PATENTS

| 2,089,588 | 8/1937 | Von Mihaly | 178—7.6 |
| 2,163,547 | 6/1939 | Clothier et al. | 178—7.6 |

OTHER REFERENCES

Dolin et al., "A Rapid-Scan Spectrometer That Sweeps Corner Mirrors Through the Spectrum," Applied Optics, vol. 6, No. 2, February 1967, pp. 267–274.

RONALD L. WIBERT, Primary Examiner

F. L. EVANS, Assistant Examiner

U.S. Cl. X.R.

250—83.3; 350—7; 356—74, 98